United States Patent                              [11] 3,609,123

| [72] | Inventors | Guy Rabilloud;<br>Bernard Sillion; Gabriel De Gaudemaris,<br>all of Grenoble, France |
|---|---|---|
| [21] | Appl. No. | 805,857 |
| [22] | Filed | Mar. 10, 1969 |
| [45] | Patented | Sept. 28, 1971 |
| [73] | Assignee | Institut Francais Du Petrole Des<br>Carburants Et Lubrifiants<br>Rueil Malmaison (Hauts de Seine), France |
| [32] | Priority | Mar. 21, 1968 |
| [33] | | France |
| [31] | | 144,875 |

[54] NEW AROMATIC POLYIMIDES, THEIR MANUFACTURE AND USES
30 Claims, No Drawings

[52] U.S. Cl...................................................... 260/47 CP,
117/124 E, 117/161 P, 161/197, 260/30.2,
260/30.4 N, 260/30.6 R, 260/31.2 N, 260/32.6 N,
260/33.2 R, 260/33.4 R, 260/33.4 P, 260/65,
260/78 A, 260/78 TF, 260/346.3, 260/471 R,
260/518 R
[51] Int. Cl............................................................. C08g 20/32
[50] Field of Search........................................... 260/47 CZ,
65, 78 TF, 78 A, 326 N, 469, 471, 518, 346.7,
346.3

[56]                    References Cited
                    UNITED STATES PATENTS
| 3,414,546 | 12/1968 | Werntz......................... | 260/78 |
| 3,450,678 | 6/1969 | Rogers ......................... | 260/78 |

*Primary Examiner*—William H. Short
*Assistant Examiner*—L. L. Lee
*Attorney*—Millen, Raptes & White ABSTRACT: Having a variety of uses, including the production of varnishes, films, fibers, adhesives, and cross-linked structures, there are provided polymers of

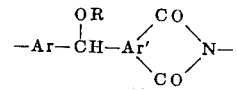

in which Ar is a divalent aromatic radical, the two valences of which are connected to distinct carbon atoms, Ar' is a trivalent aromatic radical, the three valences of which are connected to distinct carbon atoms, the two valences connected to the CO groups being in ortho position with respect to one another, and R is selected from the group consisting of a hydrogen atom, alkyl, alkylcarbonyl, aryl, arylcarbonyl, alkyliminocarbonyl, aryliminocarbonyl and trimethylsilyl.

AROMATIC POLYIMIDES, THEIR MANUFACTURE AND USES

This invention relates to the manufacture of new aromatic polyimides containing either free or substituted, carbinol (CHOH) linkages between the aromatic rings, by polycondensation of difunctional monomers as hereinafter defined.

These monomers may be stored without inconvenience and with most of them, the polycondensation may be stopped at any stage of the reaction, while maintaining the stoichiometrical proportions, since the reacting groups are present on the same molecule.

It could be expected that the presence of carbinol groups would make the macromolecular chains unstable. On the contrary, it has been observed that the polymers not only have a good thermal stability, but are also suitable for manufacturing composite materials of good mechanical properties at a high temperature. It is thus possible to prepare prepolymers soluble in many organic solvents and melting within an adequate temperature range. This makes them particularly suitable for making shaped articles, for sticking such materials as wood, metals or glass, or as binders for manufacturing laminates. Some of the monomers of this invention have a higher reactivity which makes them useful for manufacturing high polymers which can be used for producing varnishes, films or fibers.

The carbinol groups have the following advantages: they make the macromolecular chains more pliable; at least a part of them may be used for curing vicinal polymeric chains in order to improve the mechanical properties of the materials at high temperature; finally when manufacturing laminates based on silica or glass fabric, a number of alcohol groups may react with silanol groups on the glass surface to give siloxane linkages improving the adhesivity between the resin and glass. Furthermore, the free or substituted hydroxy group increases, by inductive effect, the reactivity of the amine group.

Now, according to this invention, difunctional monomers may be used, which conform to the following formulas:

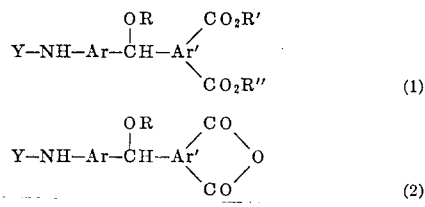

so as to obtain polymers having the following recurring units:

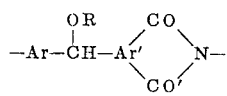

In these formulas Y is a hydrogen atom or a hydrogen atom together with an acid or an acyl or arylsulfonyl radical, R is a hydrogen atom, an optionally substituted hydrocarbyl rest, for example alkyl, alkylcarbonyl, aryl, arylcarbonyl, alkyl-or aryliminocarbonyl or trimethylsilyl. R' and R" are hydrogen atoms, optionally substituted hydrocarbyl radicals, for example alkyl, alkoxyalkyl, cycloalkyl, hydroxyalkyl or aryl. Each of R, R' and R" preferably contains one to 10 carbon atoms. Ar is a divalent aromatic radical, of the homocyclic or heterocyclic type, the two valences of which are connected to distinct carbon atoms in any position with respect to one another. These rings preferably contain five to seven atoms selected from carbon, oxygen, sulfur and nitrogen, several rings (for example two to six) being optionally fused or interconnected. Each of the Ar radicals preferably contains two to 22 carbon atoms, zero to three oxygen atoms, zero to three sulfur atoms, zero to three nitrogen atoms and the required hydrogen amount for satisfying the valences. Ar' is a homocyclic or heterocyclic trivalent aromatic radical, the three valences of which are joined to distinct carbon atoms, two of which, linked to the CO groups, being necessarily in the ortho position with respect to another. Ar' preferably contains one or several (for example two to six fused or interconnected rings, each containing five to seven atoms, selected from carbon, oxygen, Ar' and nitrogen. Ar' preferably contains three to 22 carbon atoms, zero to three oxygen atoms, zero to three sulfur atoms, zero to three nitrogen atoms and hydrogen in a sufficient amount for satisfying the valences.

When Ar and Ar' comprise several interconnected rings, the linkages are preferably the direct bond or one of the following R''' atoms or groups: —O—, —S—, —SO—, —SO$_2$—, —CH$_2$—, —CO—, —CHOH—, —CHOR$_4$—, —NH—, —NR$_4$—, —CF$_2$—, —CONH—, —Si(R$_4$)$_2$—, —C(R$_4$)$_2$— in which R$_4$ is alkyl of preferably one to 10 carbon atoms, or aryl or six to 10 carbon atoms.

As examples of rings which may be included in the Ar radicals, the following are to be mentioned:

a. benzene, naphthalene, phenanthrene, perylene, fluorene, anthracene, diphenyl, diphenylmethane, benzophenone, diphenylsulfide, diphenylsulfone, diphenylsulfoxide, benzanilide, diphenylether, dimethyldiphenylsilane, pyridine, pyridazine, pyrazine, pyrimidine, thiophene, furan, quinoline, isoquinoline, indole, isoindole, phenoxazine, benzothiazine, dibenzothiazine, acridine, phenazine, quinazoline, quinoxaline, 1,3-thiazole, 1,3-oxazole, imidazole, carbazole, benzimidazole, 1,2,4-triazine.

b. 1,3,4-oxadiazole, 1,3,4-thiadiazole, 1,3,5-triazine, furazan.

As examples of rings which may be included in the Ar' radicals, those pertaining to the above (a) series may be mentioned.

The synthesis of the monomers may be conducted according to methods known in the art for manufacturing benzhydrol or its derivatives, as described, for example, by E. H. Rodd in "Chemistry of Carbon Compounds", vol. III-B, p. 1,059 to 1,062. The three main reactions may be illustrated as follows:

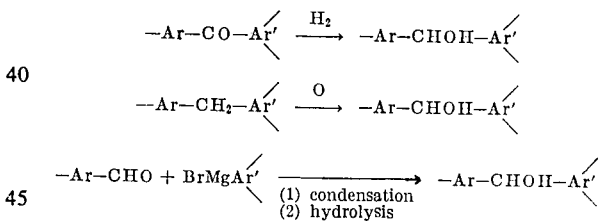

The hydroxy group may be either free or engaged in a reaction giving an ether, ester, urethane, siloxane, for example.

From any of the above reactions, the following monomers may be manufactured:

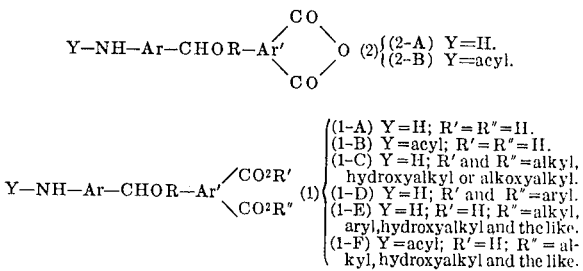

The selection of the polycondensation conditions depends essentially on the nature of the reactive groups, on the monomer molecule, but depends also on the properties required for a given use. The following methods are descriptive of the numerous possibilities resulting from the use of monomers (1) and (2) in the manufacture of aromatic polyimides. The reaction temperature is usually between 0° and 400°C.

Except with monomers (2—A) which have a particularly reactive anhydride group (the temperature is then preferably taken between 0° and 200° C.), the conversion of the monomers is carried out at a relatively high temperature, either as a solution in an appropriate solvent or by treatment in the solid or fused state. The preferred solvents usually are polar solvents which do not substantially react with the monomers or polymers and are able to dissolve the polymers up to a given state of the polycondensation reaction. These solvents may be used at their normal boiling point or at a higher temperature in an autoclave. Among these solvents, dimethylformamide, dimethylacetamide, N-methyl pyrrolidone, dimethylsulfoxide, hexamethylphosphoramide, pyridine, quinoline, phenol, cresols, chlorophenols, phenyl oxide may be mentioned.

When the polycondensation reaction is carried out without solvent, the monomers are usually heated up to a temperature higher than 150° C., for example between 175° and 400° C., so that the reaction can easily take place. In the presence of a solvent, the temperature may be chosen between 100° and 400°C.

In both cases, the polycondensation reaction takes place with a release of volatile products, the nature of which is dependent on the monomer used. These products are, for example, water (monomer 1–A), water and aliphatic carboxylic acid (1–B), an alcohol or a glycol (1–C), a phenol (1–D), water and an alcohol, glycol or phenol (1–E), a carboxylic acid and an alcohol, glycol or phenol (1 –F).

Irrespective of the initial conditions, the reaction may be terminated by a stepwise heating under vacuum up to 400°C. During the heating, cyclic imides are formed and the resulting polymers are infusible and insoluble in organic solvents.

In these polycondensations, mixtures of monomers may be used which have different Ar and Ar' radicals, the stoichiometrical proportions being maintained, due to the nature of the reactants.

The polymerization of the (2–A) monomers must be particularly mentioned since these monomers may react at a high temperature with or without solvent, on the one hand, and they may react at room temperature in polar solvents to give polyamide-acids (3) of high molecular weight, on the other hand. These soluble polymers may be used for manufacturing films or fibers. They are subsequently converted to polyimides (4) by a further thermal treatment or by means of a dehydrating agent such as a mixture of acetic anhydride with pyridine according to the following scheme:

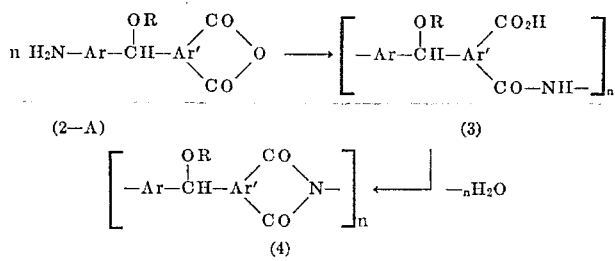

According to another embodiment, there is carried out a polycondensation of monomers (2–A) as a solution, the amine group of which, instead of being free, is salified by a strong mineral acid such as hydrochloric acid or sulfuric acid. In that case, the polycondensation is carried out in the presence of a mineral acid acceptor. This compound may be the solvent itself if it is a base such as pyridine, a N,N-dialkylcarboxamide such as dimethylacetamide, a N-substituted lactame such as N-methyl pyrrolidone, or an amide such as hexamethylphosphoramide. These solvents as well as many other polar solvents may be used together with a tertiary amine such as triethylamine, a base such as sodium carbonate or any other mineral acid acceptor.

Although the monomers (2–A) are preferably used for manufacturing films, fibers or varnishes, the other monomers are preferably used for manufacturing adhesives or as binders for laminates. The polycondensation reaction at a high temperature may be easily controlled and, for example, stopped at a moderate degree of polymerization, so as to isolate a fusible prepolymer which is soluble in conventional polar solvents. The polymerization reaction may be completed by a further heating of the prepolymer with the impregnated material in a press at a high temperature.

In order to manufacture mixed materials, there may be used either the monomers, or prepolymers of low molecular weight, which are soluble in many organic solvents, or even prepolymers of higher molecular weight which are soluble in a small number of polar organic solvents.

When monomers are to be used, they are dissolved in relatively volatile solvents such as methanol, ethanol, acetone, dioxane, ethyl acetate, tetrahydrofuran or dialkyl ethers, or in mixtures of these solvents with heavier solvents. The concentration of monomer may be chosen between 5 and 80 percent by weight, and preferably between 20 and 60 percent.

The monomers may also be prepolymerized, either in solution or in the molten state at an average temperature preferably between 100°and 220°C. The polycondensation reaction is stopped when the polymers have an inherent viscosity between 0.08 and 0.40 and preferably between 0.08 and 0.20, as determined at 30° C. for a concentration of 0.5 percent by weight in N-methyl pyrrolidone. The prepolymers are thereafter dissolved, if necessary, in a convenient solvent such as dioxane, pyridine or phenol, so as to obtain an impregnating solution.

The polycondensation reaction may be carried out up to a further stage so as to prepare polymers having an inherent viscosity, as determined hereabove, between 0.15 and 0.40 . The polycondensation is then stopped before the melting point of the prepolymers has attained 350° to 370° C. The resulting compounds are soluble only in some polar solvents such as dimethylsulfoxide, hexamethylphosphoramide, N-methyl pyrrolidone and chlorophenols., The solutions of monomers or prepolymers may be applied on the desired substrates, for example glass fabric. The amount of solution must be such that the ratio resin/glass be 15 to 70 percent and preferably 20 to 45 percent by weight, after the solvent has been evaporated. The impregnated elements may be applied in close contact therebetween, so as to obtain a laminate which is thereafter heated under a pressure at which the different layers become strongly adhesive to each other. This operation is preferably conducted in two or three successive steps, at first at a moderate temperature with or without pressure, and then at a high temperature and pressure. After cooling, the laminate may be reheated under reduced pressure or inert atmosphere between 200° and 400°C.

This invention is illustrated by the following nonlimitative examples (the inherent viscosities are given at 30° C. for a concentration of polymer of 0.5 percent in N-methyl pyrrolidone.)

EXAMPLE 1

4'--amino-3,4-diethoxycarbonyl benzhydrol is obtained by hydrogenolysis of diethyl 4-(para-nitrobenzoyl)-phtalate dissolved ethanol.

This reaction is carried out in the presence of 5 percent palladium on active carbon at a hydrogen pressure of 5 kg./cm.$^2$ . By progressive heating of this monomer from 100° up to 300°C., and then heating at 300°C. for 4 hours, there is obtained a prepolymer having an inherent viscosity of 0.40 . The polycondensation is completed by progressive heating from 300° to 400° C. in 2 hours at 0.01 mm.Hg. After cooling, the polymer exhibits the infrared characteristic absorption of cyclic aromatic imides. It is infusible and insoluble in organic solvents and its dissolution in concentrated sulfuric acid takes place with a substantial decomposition.

The thermal stability of the polymer has been determined with a thermobalance and a temperature increase of 60° C.

per hour. The decomposition threshold is about 420° C. in an argon atmosphere, and 350° C. in the air.

EXAMPLE 2

32 g. of 3-amino 3,4-diethoxycarbonyl benzhydrol (manufactured by hydrogenolysis of diethyl 4-(meta-nitro benzoyl) phthalate are admixed with 400 mg. of an antioxidant of the poly-phenol type. This mixture is heated at C. for 1 ½ hours, thus resulting in a prepolymer having an inherent viscosity of 0.12. This prepolymer is dissolved in 40 ml. of N-methyl pyrrolidone and used to impregnate a glass fabric. The solvent is thereafter evaporated and the impregnated cloth is cut in 12 identical pieces. The laminate is introduced in a press and treated as follows: 5 min. at 200° C., 1 hour from 200° to 300° C. and 3 hr. at 300° C. without pressure, and then at 15 kg./cm.²: 1 hr. at 350° C. and 1 hour at 370°C. After cooling, the laminate is reheated in an inert atmosphere for 75 hours at 350°C. The resulting samples exhibit the following characteristics:

Bending strength at 25° C.: 50–53 kg./mm.².
Bending strength at 300°C.: 45 kg./mm.².
After 100 hr. at 300°C. in the air: 33–34 kg./mm.².
After 200 hr. at 300° C. in the air: 25–26 kg./mm.².
After 400 hr. at 300° C. in the air: 16–18 kg./mm.².

EXAMPLE 3

4-(meta-nitro benzoyl) phthalic anhydride is reacted with absolute methanol and the resulting mixture is subjected to a hydrogenolysis in the presence of 5 percent palladium on carbon. After evaporation of the solvent, there is obtained a mixture of the isomeric monoesters: 3:-amino-carboxy-4-methoxycarbonyl benzhydrol and 3:-amino-4-carboxy-3-methoxycarbonyl benzhydrol.

The polycondensation is carried out in an argon atmosphere at a temperature between 150° and 250°C. The inherent viscosity is given in table I:

TABLE I

| Temperature °C. | Time min. | Inherent viscosity |
|---|---|---|
| 150 | 30 | 0.11 |
|  | 60 | 0.12 |
| 200 | 30 | 0.125 |
|  | 60 | 0.13 |
| 250 | 5 | 0.20 |
|  | 10 | insoluble |

Thereafter follows a thermal treatment under reduced pressure of 1 hour at 250° C., 1 hr. at 300° C., 1 hr. at 350° C. and 30 min. at 400°C. The thermogravimetric analysis, as described in example 1, shows a decomposition threshold at 400° C. under inert atmosphere and 350° C. in the air.

EXAMPLE 4

16 g. of the mixture of the isomeric mono-methyl esters of example 3 are dissolved in 20 ml. of ethanol and poured on a glass fabric. After evaporation of the solvent, 12 sheets of impregnated glass fabric are superposed and placed in a hydraulic press at a low pressure for 30 min. at 150° C. and 15 min. at 200°C. A pressure of 15 kg./cm.² is applied thereafter and the temperature is maintained at 370° C. for 3 hours and 400° for 30 min.

The material has a bending strength of 45–46 kg/mm.² at 25° C. and 38–40 kg./mm.² at 300°C. After ageing in the air at 300° C. the following values are obtained: 35 kg./mm.² after 100 hr., 30 kg./mm.² after 250 hr. and 30 kg./mm.² after 500 hr.

EXAMPLES 5 to 17

Examples 1 and 3 are repeated with the following monomers (the obtained polymers have thermal stabilities substantially as found in example 3):

| Example number | Monomers |
|---|---|
| 5 | $H_2N-\bigcirc-CHOH-\bigcirc(-CO_2C_6H_5)(-CO_2C_6H_5)$ |
| 6 | $H_2N-\bigcirc-CHOH-\bigcirc(-CO_2C_6H_5)(-CO_2C_6H_5)$ |
| 7 | $H_2N-\bigcirc-CH(OCOCH_3)-\bigcirc(\text{phthalic anhydride})$ |
| 8 | $H_2N-\bigcirc-CHOH-\bigcirc(-CO_2H)(-CO_2H)$ |
| 9 | $H_2N-\bigcirc-CH(OCH_3)-\bigcirc(-CO_2C_6H_5)(-CO_2C_6H_5)$ |
| 10 | $H_2N-\bigcirc-CHOH-\bigcirc-CHOH-\bigcirc(-CO_2H)(-CO_2C_2H_5)$ |

| Example number | Monomers |
|---|---|
| 11 | H₂N—⌬—O—⌬—CHOH—⌬(—CO₂C₆H₅)(—CO₂C₆H₅) |
| 12 | (H₂N—⌬)—O—⌬—CHOH—⌬(—CO₂H)(—CO₂CH₃) |
| 13 | H₂N—⌬—CHOH—⌬(—CO₂CH₃)(—CO₂CH₃) |
| 14 | H₂N—⌬⌬—CHOH—⌬⌬(—CO₂H)(CO₂C₄H₉) |
| 15 | H₂N—⌬—CHOH—⌬—O—⌬(—CO₂CH₃)(—CO₂C₆H₅) |
| 16 | H₂N—⌬(—CHOH—⌬)—SO₂—⌬(—CO₂H)(—CO₂H) |
| 17 | H₂N—⌬—O—⌬—CHOH—⌬—O—⌬(—CO₂C₆H₅)(—CO₂C₆H₅) |

This invention also relates to two improvements of the process described herein.

It has been shown in example 4 that the obtained polymers may be heated in a press up to 400°C. This is sometimes difficult, particularly with bodies of large size or complex shape.

It has now been found that this heating step may be carried out at only 300° to 380° C. provided a curing agent is present, which constitutes the first improvement of this invention.

This curing agent is any aromatic compound having at least three reactive groups, selected from the following A, B and C groups:

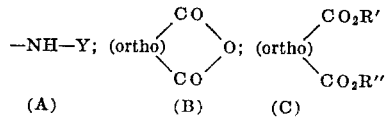

i.e. the same groups as those present in the monomers of formulas (1) and (2), these aromatic compounds having either at least three identical groups as hereabove mentioned or at least three groups amongst which at least two differ.

In any case, it is preferred that the various A, B and C groups of both the monomers (formulas 1 and 2) and the curing agents be present in stoichiometrical amounts, i.e. one group (B) or (C) per group (A).

The curing agent may be used in a molar amount of 0.5 to 80 percent, and preferably 5 to 50 percent, with respect to the monomers (1) and (2).

According to a second improvement of this invention, the temperature of the pressing treatment may be selected at a lower level, for example 200° to 300° C., provided organic compounds of phosphorus, silicon or boron are present, for example siloxanes, silanols, boric esters, phosphorus esters or phosphoric esters, in a preferred molar amount of 0.1 to 20 percent, more particularly 0.5 to 10 percent, with respect to the monomers (1) and (2).

The following examples are illustrative of these improvements.

EXAMPLE 18

A mixture of 16 g. (about 0.05 mole) of a mixture of 3'-amino-3-carboxy-4-ethoxycarbonyl benzhydrol is dissolved in 20 ml. ethanol and 2 millimoles of 2,4,4'-triamino-diphenylether and 3 millimoles of the ethyl hemi-acid-esters of 3,3:4,4A glass fabric of the type E-181, without finish, is impregnated with the resulting solution in order to make a laminate, under the conditions of example 4, except the conditions of the heating step at 15 kg./cm.² which is carried out at 350° C. for 3 hours.

The bending strength is 50 kg./mm.² at 25° C. and 49 kg./mm. after aging in the air at 300° C. for 250 hours.

EXAMPLES 19 to 21

Three samples of the ethanolic solution of example 18 are used to make three laminates, an additive being however added to each sample.

The following results have been obtained:

| Example | Curing agent (% by weight with respect to the monomer) | Bending strength kg./mm.² at 25° C. |
|---|---|---|
| 19 | 10% tri-cresyl phosphate | 52 |
| 20 | 5% tri-phenyl borate | 45 |
| 21 | 2% phenyl-phosphite | 43 |

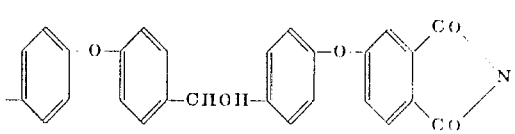

We claim:

1. A new polymer consisting essentially of a chain of recurring units of the following formula:

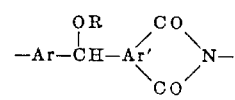

in which Ar is a divalent aromatic radical, the two valences of which are connected to distinct carbon atoms, Ar' is a trivalent aromatic radical, the three valences of which are connected to distinct carbon atoms, the two valences connected to the CO groups being in ortho position with respect to one another, and R contains not more than 10 carbon atoms and is selected from the group consisting of a hydrogen atom, alkyl, alkylcarbonyl, aryl, arylcarbonyl, alkyliminocarbonyl, aryliminocarbonyl and trimethylsilyl.

2. A polymer as defined by claim 1 having a minimum inherent viscosity of about 0.15 as determined at 30° C. for a concentration of 0.5 percent by weight in N-methyl pyrrolidone.

3. A polymer as defined by claim 1 wherein said polymer is a homopolymer.

4. A process as defined by claim 1, wherein the condensation step is carried out in the presence of at least one compound selected from the group consisting of tri-cresyl phosphate, tri-phenyl borate and phenyl phosphite.

5. A prepolymer as defined by claim 4, wherein said monomer is 4'-amino-3,4-diethoxycarbonyl benzhydrol.

6. A prepolymer as defined by claim 4, wherein said monomer is 3'amino-3,4-diethoxycarbonyl benzhydrol.

7. A prepolymer as defined by claim 4, wherein said monomer is $$H_2N-\text{C}_6H_4-CHOH-\text{C}_6H_3(CO_2C_6H_5)_2$$

8. A prepolymer as defined by claim 4, wherein said monomer is $$H_2N-\text{C}_6H_4-CH(OCH_3)-\text{C}_6H_3(CO_2C_6H_5)_2$$

9. A prepolymer as defined by claim 4, wherein said monomer is $$H_2N-\text{C}_6H_4-CHOH-\text{C}_6H_3(CHOH)(CO_2H)(CO_2C_2H_5)$$

10. A prepolymer as defined by claim 4, wherein said monomer is $$H_2N-\text{C}_6H_4-O-\text{C}_6H_4-CHOH-\text{C}_6H_3(CO_2C_6H_5)_2$$

11. A prepolymer as defined by claim 4, wherein said monomer is $$H_2N-\text{C}_6H_4-O-\text{C}_6H_4-CHOH-\text{C}_6H_3(CO_2H)(CO_2CH_3)$$

12. A prepolymer as defined by claim 4, wherein said monomer is $$H_2N-\text{C}_6H_4-\text{C}_6H_4-CHOH-\text{C}_6H_3(CO_2CH_3)_2$$

13. A prepolymer as defined by claim 4, wherein said monomer is $$H_2N-\text{(naphthyl)}-CHOH-\text{(naphthyl)}(CO_2H)(CO_2C_4H_9)$$

14. A prepolymer as defined by claim 4, wherein said monomer is $$H_2N-\text{C}_6H_4-CHOH-\text{C}_6H_4-O-\text{C}_6H_3(CO_2CH_3)(CO_2C_6H_5)$$

15. A prepolymer as defined by claim 4, wherein said monomer is $$H_2N-\text{C}_6H_4-O-\text{C}_6H_4-CHOH-\text{C}_6H_4-O-\text{C}_6H_3(CO_2C_6H_5)_2$$

16. A prepolymer consisting essentially of recurring units of the formula $$-Ar-\underset{\underset{H}{|}}{C}(OR)-Ar'\underset{\diagdown}{\overset{\diagup CO_2H}{}}_{CO-N-}$$

in which Ar is a divalent aromatic radical, the two valences of which are connected to distinct carbon atoms, Ar' is a trivalent aromatic radical, the three valences of which are connected to distinct carbon atoms, the two valences connected to the CO groups being in ortho position with respect to one another, and R contains not more than 10 carbon atoms and is selected from the group consisting of a hydrogen atom, alkyl, alkylcarbonyl, alkyl, arylcarbonyl, alkyliminocarbonyl, aryliminocarbonyl and trimethylsilyl, said prepolymer having an inherent viscosity of 0.08–0.40 as measured at 30° C. in a 0.5 percent by weight concentration in N-methyl pyrrolidone.

17. A polymer as defined by claim 1 wherein Ar and AR' are unsubstituted and contain 2-22 carbon atoms, 0–3 oxygen atoms, 0–3 sulfur atoms, and 0–3 nitrogen atoms.

18. A prepolymer having an inherent viscosity of 0.08 to 0.4, as determined at 30° C. for a concentration of 0.5 percent by weight in N-methyl pyrrolidone, prepared by condensing, at a temperature between 0° and 400° C., a monomer of the formula:

$$Y-NH-Ar-\underset{\underset{H}{|}}{C}(OR)-Ar'\underset{\diagdown}{\overset{\diagup CO_2R'}{}}_{CO_2R''}$$

in which Ar is a divalent aromatic radical, the two valences of which are connected to distinct carbon atoms, AR' is a trivalent aromatic radical, the three valences of which are connected to distinct carbon atoms, the two valences connected to the CO groups being in ortho position with respect to one another, and R contains not more than 10 carbon atoms and is selected from the group consisting of a hydrogen atom, alkyl alkylcarbonyl, aryl, arylcarbonyl, alkyliminocarbonyl, aryliminocarbonyl and trimethylsilyl;

Y is hydrogen, hydrogen together with a mineral acid, acyl, or arylsulfonyl; and R' and R'' each is not more than 10 carbon atoms and is hydrogen, alkyl, alkoxyalkyl, cycloalkyl, hydroxyalkyl or aryl, with the provision that one of R' and R'' is not hydrogen.

19. A process for manufacturing a polymer by condensing, at a temperature between 0° and 400° C., a monomer selected from the group consisting of:

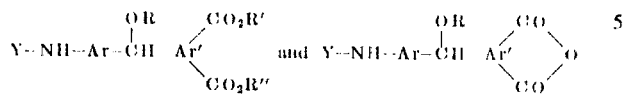

in which Ar is a divalent aromatic radical, the two valences of which are connected to distinct carbon atoms, Ar' is a trivalent aromatic radical, the three valences of which are connected to distinct carbon atoms, the two valences connected to the CO groups being in ortho position with respect to one another and R contains not more than 10 carbon atoms and is selected from the group consisting of a hydrogen atom, alkyl alkylcarbonyl, aryl, arylcarbonyl, alkyliminocarbonyl, aryliminocarbonyl and trimethylsilyl;

Y is hydrogen, hydrogen taken together with a mineral acid, acyl, or arylsulfonyl; and R' and R'' each is not more than 10 carbon atoms and is hydrogen, alkyl, alkoxyalkyl, cycloalkyl, hydroxyalkyl or aryl; wherein the condensation step is conducted in the presence of 2,4,4'-triaminodiphenylether.

20. A process for manufacturing a polymer by condensing, at a temperature between 0° and 400° C., a monomer selected from the group consisting of:

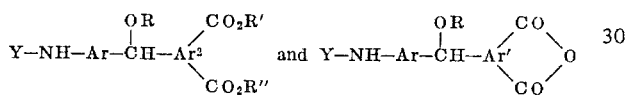

in which Ar Ar is a divalent aromatic radical, the two valences of which are connected to distinct carbon atoms, Ar' is a trivalent aromatic radical, the three valences of which are connected to distinct carbon atoms, the two valences connected to the CO groups being in ortho position with respect to one another, and R contains not more than 10 carbon atoms and is selected from the group consisting of a hydrogen atom, alkyl, alkylcarbonyl, aryl, arylcarbonyl, alkyliminocarbonyl, aryliminocarbonyl and trimethylsilyl;

Y is hydrogen, hydrogen taken together with a mineral acid, acyl, or arylsulfonyl; and R' and R'' each is not more than 10 carbon atoms and is hydrogen, alkyl, alkoxyalkyl, cycloalkyl, hydroxyalkyl or aryl; wherein the condensation step is conducted in the presence of a curing agent selected from the group consisting of tri-cresyl phosphate, tri-phenyl borate and phenyl phosphite.

21. A polymer as defined by claim 1, said polymer being units of the following formula:

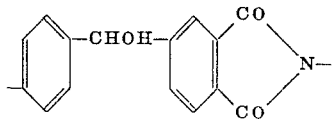

22. A polymer as defined by claim 1, said polymer being of units of the following formula:

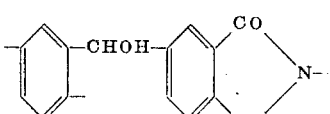

23. A polymer as defined by claim 1, said polymer being of units of the following formula:

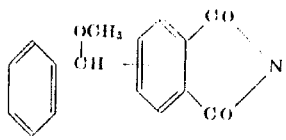

24. A polymer as defined by claim 1, said polymer being of units of the following formula:

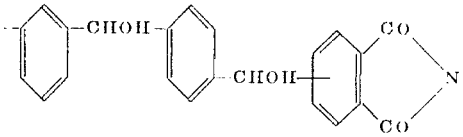

25. A polymer as defined by claim 1, said polymer being of units of following formula:

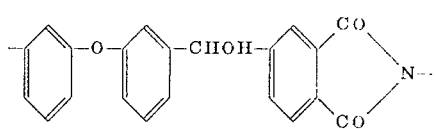

26. A polymer as defined by claim 1, said polymer being of units of the following formula:

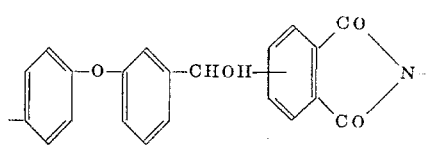

27. A polymer as defined by claim 1, said polymer being of units of the following formula:

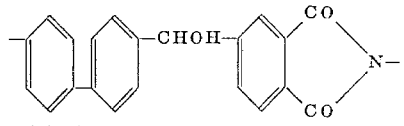

28. A polymer as defined by claim 1, said polymer being of units of the following formula:

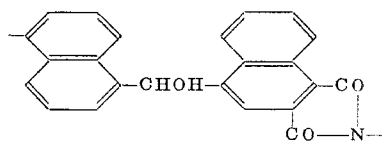

29. A polymer as defined by claim 1, said polymer being of units of the following formula:

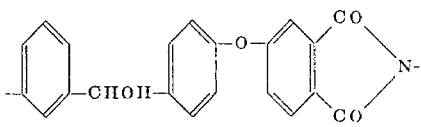

30. A polymer as defined by claim 1, said polymer being of units of the following formula: